(12) United States Patent
Engström et al.

(10) Patent No.: US 10,178,589 B2
(45) Date of Patent: Jan. 8, 2019

(54) METHODS IN A RADIO ACCESS NODE FOR OBTAINING NEIGHBOURING INFORMATION AND RADIO ACCESS NODES

(71) Applicant: TELEFONAKTIEBOLAGET LM ERICSSON (PUBL), Stockholm (SE)

(72) Inventors: Stefan Engström, Linköping (SE); Lisa Boström, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 226 days.

(21) Appl. No.: 15/106,796

(22) PCT Filed: Dec. 20, 2013

(86) PCT No.: PCT/SE2013/051612
§ 371 (c)(1),
(2) Date: Jun. 20, 2016

(87) PCT Pub. No.: WO2015/094074
PCT Pub. Date: Jun. 25, 2015

(65) Prior Publication Data
US 2016/0337911 A1 Nov. 17, 2016

(51) Int. Cl.
*H04W 36/00* (2009.01)
*H04W 74/00* (2009.01)
*H04W 76/00* (2018.01)
*H04L 5/00* (2006.01)
*H04W 92/20* (2009.01)

(52) U.S. Cl.
CPC ......... *H04W 36/0061* (2013.01); *H04L 5/001* (2013.01); *H04L 5/0098* (2013.01); *H04W 74/002* (2013.01); *H04W 74/004* (2013.01); *H04W 76/00* (2013.01); *H04L 5/0032* (2013.01); *H04W 74/006* (2013.01); *H04W 92/20* (2013.01)

(58) Field of Classification Search
CPC ... H04W 36/0061; H04L 5/001; H04L 5/0098
See application file for complete search history.

(56) References Cited

U.S. PATENT DOCUMENTS

2010/0039992 A1* 2/2010 Prakash ................ H04W 8/005
370/328
2011/0269464 A1* 11/2011 Xu .................... H04W 36/0033
455/436

OTHER PUBLICATIONS

Alcatel-Lucent, "Suppport for DL-only Carrier for CA", 3GPP TSG-RAN WG3 Kbis, R3-120762, AT&T, 2012, 3 pages.*
(Continued)

*Primary Examiner* — Siming Liu
(74) *Attorney, Agent, or Firm* — Sage Patent Group (57) ABSTRACT

The present disclosure relates to a method (200) in a first radio access node for obtaining neighboring cell information. The method comprises the steps of transmitting via an interface a radio access node request (Si2) for set-up information related to the neighboring cell to at least one second radio access node, and receiving a radio access node response (Si3) over the interface from said at least one second radio access node. The radio access node response (Si3) comprises set-up information including an indicator related to the neighboring cell's capability for uplink transmission. The present disclosure also relates to said first radio access node.

23 Claims, 4 Drawing Sheets (56) References Cited

OTHER PUBLICATIONS

3GPP, 3rd Generation Partnership Project; Technical Specification Group Radio Access Network; Evolved Universal Terrestrial Radio Access Network (E-UTRAN); X2 application protocol (X2AP); (Release 11), 3GPP TS 36.423 V11.0.0, 2012, 134 pages.*

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.7.0, 2013, 209 pages.*

International Search Report and Written Opinion dated Oct. 8, 2014, in International Application No. PCT/SE2013/051612, 22 pages.

Alcatel-Lucent, et al. "Support for DL-only Carrier for CA" 3GPP TSG-RAN WG3 #75bis, R3-120762, 2012, 3 pages.

Alcatel-Lucent, et al. "Signalling of DL-only Carrier Cells" 3GPP TSG-RAN 3 Meeting #75bis, change request, R3-120763, 2012, 4 pages.

3GPP, 3rd Generation Partnership Project; Technical Specification Group Services and System Aspects; Telecommunication management; Automatic Neighbour Relation (ANR) management; Concepts and requirements (Release 11), 3GPP TS 32.511 V11.2.0, 2012, 13 pages.

Lucent Technologies "Discussion on Intra-access mobility in LTE_Active" Joint 3GPP TSG RAN WG2/RAN WG3, R3-051130, 2005, 3 pages.

ETSI Technical Specification, LTE; Evolved Universal Terrestrial Radio Access Network (E-UTRAN); X2 Application Protocol (X2AP) (3GPP TS 36.423 version 11.6.0 Release 11), 2013, 145 pages.

3GPP, 3rd Generation Partnership Project; Technical Specification Group Radio Access Network; Evolved Universal Terrestrial Radio Access (E-UTRA); Base Station (BS) radio transmission and reception (Release 12), 3GPP TS 36.104 V12.0.0, 2013, 139 pages.

European Search Report dated Sep. 21, 2016, issued in European Patent Application No. 13899533.7, 5 pages.

ETSI Technical Specification, LTE; Evolved Universal Terrestrial Radio Access (E-UTRA) and Evolved Universal Terrestrial Radio Access Network (E-UTRAN); Overall description; Stage 2 (Release 11), 3GPP TS 36.300 V11.7.0, 2013, 222 pages.

* cited by examiner

One component carrier

Fig. 6b

One component carrier

Fig. 6c

One component carrier

Fig 7

UE 790 eNB 780b

Handover/secondary cell connection request — Si7

Evaluate request — P4

Handover/secondary cell connection response — Si8

Decision — P5

METHODS IN A RADIO ACCESS NODE FOR OBTAINING NEIGHBOURING INFORMATION AND RADIO ACCESS NODES

CROSS REFERENCE TO RELATED APPLICATION(S)

This application is a 35 U.S.C. § 371 National Phase Entry Application from PCT/SE2013/051612, filed Dec. 20, 2013, designating the United States, the disclosure of which is incorporated herein in its entirety by reference.

TECHNICAL FIELD

The present disclosure relates to a method in a first radio access node for obtaining neighbouring cell information.

The present disclosure relates to a first radio access node for obtaining neighbouring cell information.

The present disclosure further relates to a method in a second radio access node for providing set-up information.

The present disclosure further relates to a second radio access node for providing set-up information.

The present disclosure further relates to a method for handover or connection to a secondary cell in a radio access node.

The present disclosure further relates to a method for handover or connection to a secondary cell in a wireless device.

BACKGROUND

The third generation partnership project (3GPP) relates to standardization of the Long Term Evolution, LTE, concept. The architecture of the LTE system includes radio access nodes, eNBs, and interfaces to evolved packet core nodes, MME/S-GW. The interface between eNBs is referred to as X2, and the interface between eNB and MME is denoted S1.

From LTE Release-10, aggregation of carriers is supported with individual bandwidths up to 20 MHz (which is the maximal LTE Rel-8/9 carrier bandwidth). Hence, LTE Rel-10 allows for operations wider than 20 MHz. Such operations appear as a number of LTE carriers to an LTE user equipment operating in accordance with release 10. Carrier aggregation is an optional feature in release 10 and enhancements to this feature are added in 3GPP releases later than 10.

The release standard supports up to five aggregated carriers where each carrier is limited in the RF specifications to have one of six predefined bandwidths.

Carrier aggregation is called contiguous or non-contiguous intra-band if the carriers all belong to the same 3GPP operating band. Inter-band carrier aggregation is the case when there is at least one carrier in a different 3GPP operating band. The number of aggregated component carriers, CC, as well as the bandwidth of the individual CC, may be different for uplink and downlink. A symmetric configuration refers to the case where the number of CCs in downlink and uplink is the same, whereas an asymmetric configuration refers to the case when the numbers of CCs are different. However, an asymmetric configuration where the number of uplink CCs is higher than the number of downlink CCs is not allowed.

The number of CCs configured in the network may be different from the number of CCs seen by a user equipment. A user equipment may for example support more downlink CCs than uplink CCs, even though the network offers the same number of uplink and downlink CCs.

During initial access, an LTE release 10 user equipment behaves similar to an LTE release 8/9 user equipment. The serving cell, in which the UE ends up at initial access, is referred to as the UE's Primary Cell, PCell.

Upon successful connection to the network, a user equipment may—depending on its own capabilities and the network—be configured with additional CCs in the UL and DL. These additional serving cells, which are configured for the UE, are referred to as Secondary Cells, SCells.

The Primary cell, Pcell, basically corresponds to the release 8/9 "serving cell". The UE monitors system information only on the PCell cell and also takes security and Non-access stratum, NAS, mobility information from this cell. System information needed for the SCell is provided via dedicated signalling. The SCell does not have any Physical Uplink Control Channel, PUCCH, of its own. The UE may transmit Channel State Information, CSI, for SCells on the PUCCH of the PCell. Cross-carrier scheduling (i.e. being scheduled from a Physical Downlink Control Channel, PDCCH, of another serving cell used by the same UE) is not supported for the PCell, while Semi-Persistent Scheduling, SPS and Transmission Time Interval, TTI, bundling is only supported on the PCell. Also Radio Link Monitoring and Radio Link Failure only applies to the PCell.

The PCell can be changed using handover, HO. During HO all SCells configured for the UE doing the HO will be deactivated. The target eNB (may be the same as source eNB) will then decide whether to use the same SCells, configure and activate a different set, or to simply reconfigure them.

The PCell is always activated, when the UE is Radio Resource Control, RRC, connected, while SCells can be activated and deactivated on a need basis. Activation/Deactivation of SCells is performed using a Medium Access Control Element, MAC CE, while configuration/deconfiguration is performed using RRC signalling.

To make a downlink transmission on a configured SCell or to be able to provide a UE in the SCell with an uplink grant the eNB first activates the SCell by sending an activation/deactivation command (as a MAC CE) to the UE.

When a user equipment is activated on multiple SCells this would imply it has to monitor all DL CCs for PDCCH and Physical Downlink Shared Channel, PDSCH. This implies a wider receiver bandwidth, higher sampling rates, etc. resulting in high power consumption.

A UE capable of carrier aggregation can have only one PCell and up to four SCells. The Cell-Radio Network Temporary Identifier, C-RNTI, is UE specific and the same C-RNTI is used both in the PCell and in the SCell(s).

In LTE FDD systems, most frequency bands are defined with one uplink band and one downlink band, to facilitate two-way communication. The X2 interface is available between eNBs in LTE. When an X2 link is established, information on the served cells is exchanged between the two eNBs. Thus, the frequency band used for the respective cell is communicated. For cells using FDD, a DL and an UL frequency is signalled, for all frequency bands defined as DL and UL. For frequency bands defined as DL-only in the 3GPP standards, a dummy value is given for the UL frequency.

In the special case of carrier aggregation, a UE is connected to a cell using a set of frequencies but can also simultaneously use a second cell using another set of frequencies. The second cell may by the UE either be used for both UL and DL transmission or only be used for DL transmission. Typically, the cell used as a secondary cell, has both an UL and a DL carrier from an eNB point of view even if the UE is configured to utilize e.g. only the DL carrier of this cell. Then the eNB will still have an UL frequency configured for this cell and listen to it, even if not all UEs are configured to have any UL transmission on this frequency even when the UE is using the DL frequency of the cell for data transmission.

There are however special cases where a cell from an eNB point of view can be deployed with only a DL (this is not to be confused with the case when a UE is configured to only use the DL of a cell). This means that the eNB is typically not listening on the UL frequency associated with the DL frequency of this cell or ignoring it, alternatively the DL frequency has no associated UL frequency.

In the 3GPP standards there is currently only one band (band 29) defined as DL-only, meaning that it has no uplink EUTRAN Absolute Radio Frequency Channel Number, UL-EARFCN, defined, only DL-EARFCN. Other bands are defined in the 3GPP standards with both UL-EARFCN and DL-EARFCN. For the operator, these could be desirable to use for a DL-only cell. Cells deployed as DL-only cells can be utilized for the purpose of secondary cells providing additional resources for DL transmission.

The IE Served Cell Information shown in the table below contains cell configuration information of a cell that a neighbour eNB may need for its operation. The table below is copied from version V.11.5.0 of 36.423.

As can be noted, the IE states that information provided in UL EUTRAN Absolute Radio Frequency Channel Number, EARFCN, field shall be ignored for operating bands which are defined as DL-only bands by 3GPP in 36.104. This IE can thus be used to signal that band 29 is DL-only, but for other bands which have a defined UL, there is no current way to provide this information to the neighbour eNB.

TABLE 1

The Served Cell Information IE as specified in 3GPP TS 36.423

| IE/Group Name | Presence | Range | IE type and reference | Semantics description | Criticality | Assigned Criticality |
|---|---|---|---|---|---|---|
| PCI | M | | INTEGER (0..503, . . . ) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 . . . <maxnoofBPLMNs > | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . . ) | Uplink-downlink subframe configuration information defined in TS 36.211 [10] | — | — |

TABLE 1-continued

| | | | | | | |
|---|---|---|---|---|---|---|
| >>>Special Subframe Info | 1 | | | Special subframe configuration information defined in TS 36.211 [10] | — | — |
| >>>>Special Subframe Patterns | M | | ENUMERATED (ssp0, ssp1, ssp2, ssp3, ssp4, ssp5, ssp6, ssp7, ssp8, . . . ) | | — | — |
| >>EARFCN Extension | O | | 9.2.65 | If this IE is present, the value signalled in the EARFCN IE is ignored. | YES | reject |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED (ssp0, ssp1, ssp2, ssp3, ssp4, ssp5, ssp6, ssp7, ssp8, ssp9, . . . ) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| Number of Antenna Ports | O | | 9.2.43 | | YES | ignore |
| PRACH Configuration | O | | PRACH Configuration 9.2.50 | | YES | ignore |
| MBSFN Subframe Info | 0 . . . <maxnoofMBSFN> | | | MBSFN subframe defined in TS 36.331 [9] | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG ID | O | | 9.2.53 | | YES | ignore |
| MBMS Service Area Identity List | 0 . . . <maxnoofMBMSServiceAreaIdentities > | | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

| Range bound | Explanation |
|---|---|
| maxnoofBPLMNs | Maximum no. of Broadcast PLMN Ids. Value is 6. |
| maxnoofMBSFN | Maximum no. of MBSFN frame allocation with different offset. Value is 8. |
| maxnoofMBMSServiceAreaIdentities | Maximum no. of MBMS Service Area Identities. Value is 256. |

The EUTRAN Absolute Radio Frequency Channel Number, EARFCN, Extension defines the carrier frequency used in a cell for a given direction (UL or DL) in FDD or for both UL and DL directions in TDD. It includes Extended EARFCN including allowed range.

TABLE 2

EARFCN including allowed range described in section 9.2.26 of 36.423 (V.11.5.0)

| IE/Group Name | Presence | Range | IE Type and Reference | Semantics Description |
|---|---|---|---|---|
| EARFCN | M | | INTEGER (0 ... maxEARFCN) | The relation between EARFCN and carrier frequency (in MHz) are defined in TS 36.104 [16]. |

| Range bound | Explanation |
|---|---|
| maxEARFCN | Maximum value of EARFCNs. Value is 65535. |

TABLE 3

Extended EARFCN including allowed range as described in section 9.2.65 of 36.423 (V.11.5.0)

| IE/Group Name | Presence | Range | IE Type and Reference | Semantics Description |
|---|---|---|---|---|
| EARFCN Extension | M | | INTEGER (maxEARFCN + 1 ... newmaxEARFCN, ...) | The relation between EARFCN and carrier frequency (in MHz) are defined in TS 36.104 [16]. |

| Range bound | Explanation |
|---|---|
| maxEARFCN | Maximum value of EARFCNs. Value is 65535. |
| newmaxEARFCN | New maximum value of EARFCNs. Value is 262143. |

To sum up, in Long Term Evolution, LTE, Frequency Division Duplex, FDD, systems, most frequency bands are defined with one uplink band and one downlink band, to facilitate two-way communication. The X2 interface is available between evolved Node Bs, eNBs, in LTE. When an X2 link is established, information on the served cells is exchanged between the eNBs. Then, the frequency band used for the respective cell is communicated between the eNBs. For cells using FDD, a downlink, DL, and an uplink, UL, frequency is signalled for all frequency bands defined as DL and UL. For frequency bands defined as DL-only, a dummy value is given for the UL frequency.

SUMMARY

One object of the present disclosure is to increase flexibility in signal information for DL-only cells.

In one embodiment of the present disclosure, a method in a first radio access node for obtaining neighbouring cell information comprises the following steps. A radio access node request for set-up information related to a neighbouring cell is transmitted via an interface to at least one second radio access node. Thereafter, a radio access node response is received over the interface from said at least one second radio access node. The radio access node response comprises set-up information including an indicator related to the neighbouring cell's capability for uplink transmission.

One advantage with this solution is that information related to neighbouring cells can be communicated between the radio access nodes using any frequency band for cells only operating in DL.

In one option, the method comprises a step of receiving a wireless device request for set-up information from a wireless device. The wireless device request from the wireless device comprises information related to a neighbouring cell detected by the wireless device. The information related to the detected neighbouring cell is evaluated so as to determine whether the first radio access node has set-up information related to the detected neighbouring cell. The step of transmitting via an interface a radio access node request is performed when the first radio access node does not have set-up information related to the detected neighbouring cell. The wireless device request may be implicit by the wireless device sending a measurement report to the first radio access node. The first radio access node can then evaluate the measurements.

In one option, the first set-up response comprises information related to at least one transmission frequency for the neighbouring cell.

One advantage with this is that frequency bands defined as DL-only related to neighbouring cells can be communicated between the radio access nodes and used by the radio access nodes when appropriate. This opens up for expanding network capacity by including cells which were not previously available.

In one option, the interface is X2.

The 3GPP standard is currently only prepared/optimized to support a DL-only cell for band 29 with regards to signalling over X2. It is in accordance with this option possible to support DL-only cell for any band over X2.

In one option, the set-up information is a dedicated Information Element, IE or forms part of an Information Element, IE.

In one option, set-up information in the radio access node response is comprised in Frequency Division Multiplex, FDD, information.

By including set-up information in the radio access node response in existing messages, a minimum of signalling resources and capacity is required.

In one option, the neighbouring cell has capability as a secondary cell for carrier aggregation.

In the case of carrier aggregation, a User Equipment, UE, is connected to a cell using a set of frequencies but can also simultaneously use a secondary cell using another set of frequencies.

The secondary cell may only be used for DL transmission. Cells can then be deployed only for the purpose of being secondary cells providing extra DL transmission capacity.

This option provides an improvement in relation to today as only one frequency band is defined as DL-only for FDD. This makes it possible to use DL-only cells in other frequency bands. In prior art, either no cell information is included over X2 or the cell information over X2 indicates the DL-only cell to be DL+UL. Today using DL-only cells in other frequency bands without increasing the risk of handover failures, requires manual barring of handover to these cells. With this solution, DL parts of other frequency bands can be used as DL-only secondary cells as it is then possible to signal information for DL-only cells, not only for DL-only cells using the only defined DL-only frequency band and to automatically inhibit handover to these cells.

In one option, the method further comprises a step of storing the set-up information related to the neighbouring cell in a neighbour relation list based on the radio access node response from said at least one second radio access node.

One advantage is that the first radio access node has available a list including available neighbouring cells.

In one option, the method further comprises a step of receiving configuration update messages from said at least one second radio access node. The configuration update messages comprise the set-up information including the indicator related to the neighbouring cell's capability for uplink transmission.

One advantage is that the list including available neighbouring cells can be continuously updated.

In one option, the method further comprises a step of transmitting a wireless device set-up response to the wireless device. The wireless device set-up response comprises the set-up information including the indicator related to the neighbouring cell's capability for uplink transmission.

In one embodiment a first radio access node comprises a transmitter, a receiver, a processing unit and a memory. The processing unit is arranged to form a radio access node request for set-up information for a cell. The transmitter is arranged to transmit the radio access node request for set-up information over an interface to at least one second radio access node. The receiver is arranged to receive a response to the radio access node request for set-up information. The set-up information comprises an indicator related to the cell's capability for uplink transmission.

In one option, the receiver is arranged to receive a wireless device request for set-up information from a wireless device. The wireless device request comprises information related to a neighbouring cell detected by the wireless device. The processing unit is arranged to evaluate the information related to the detected neighbouring cell so as to determine whether the first radio access node has set-up information related to the detected neighbouring cell, and to form radio access node request for set-up information for the detected cell when the first radio access node does not have set-up information related to the detected neighbouring cell.

In one option, the memory comprises a neighbour relation list comprising the set-up information related to the detected neighbouring cell.

In one embodiment, a method in a second radio access node for providing set-up information comprises a step of receiving a radio access node request via an interface from a first radio access node for set-up information. When there is set-up information related to the identified cell in the second radio access node, a set-up response is formed comprising the set-up information. The set-up information comprises an indicator related to the identified cell's capability for uplink transmission. The set-up response is then transmitted over the interface to the first radio access node.

In one option, the set-up information comprises a global cell identity and/or a local cell identity.

In one option, the method further comprises a step of searching for the identified cell in a memory comprising set-up information for at least one neighbouring cell, wherein each cell is identified by means of the global cell identity and/or the local cell identity.

One embodiment of the present disclosure relates to a second radio access node. The second radio access node has a receiver arranged to receive a radio access node request for set-up information via an interface from a first radio access node; a processing unit arranged to evaluate the information related to the cell identified in the radio access node request so as to determine whether the second radio access node has set-up information related to the cell identified in the radio access node request, and to form a radio access node response based on the set-up information; and a transmitter arranged to transmit the radio access node response over the interface to the first radio access node. The set-up information comprises an indicator related to the identified cell's capability for uplink transmission.

One embodiment of the present disclosure relates to software for executing the steps of the method in a first radio access node for obtaining neighbouring cell information according to the above.

One embodiment of the present disclosure relates to software for executing the steps of the method in a second radio access node for providing cell information according to the above.

One embodiment of the present disclosure further relates to a method, performed in a radio access node, for handover or connection to a secondary cell. The radio access node has a memory storing set-up information for at least one neighbouring cell. The set-up information comprises an indicator related to the respective cell's capability for uplink transmission. Each cell is identified by means of a global cell identity and/or a local cell identity. The method comprises the steps of receiving a hand-over or secondary cell connection request from a wireless device, determining whether to perform the hand-over or secondary cell connection based on the stored set-up information comprising the indicator related to the cell's capability for uplink transmission, forming a response to the hand-over or secondary cell connection request based on the determination, and transmitting the formed response to the wireless device.

The request from the wireless device may be implicit by the wireless device sending a measurement report to the radio access node, which then evaluates the measurements and determines to perform a handover or secondary cell connection set-up. The decision is then transmitted in the response to the wireless device.

In using the handover or connection method, the risk of handover failure is decreased. Further inconsistent information is removed leading to a decreased risk of undefined behaviour in neighbour radio access nodes.

In one option, the set-up information comprises an indicator related to the respective cell's capability only as a secondary cell, wherein the response is formed based on the indicator related to the respective cell's capability only as a secondary cell.

In one option, the method further comprises a method in a first radio access node for obtaining neighbouring cell information according to the above.

One embodiment of the present disclosure further comprises a method, performed in a wireless device, for handover or connection to a secondary cell. The method comprises the steps of transmitting a hand-over or secondary cell connection request to at least one radio access node, said request comprising global and/or local cell identity information associated to a cell to which hand-over or secondary cell connection is desired; receiving a response to the hand-over or secondary cell connection request, said response comprising set-up information including an indicator related to the cell's capability for uplink transmission, and determining to perform handover or connection to a secondary cell based on the set-up information in the response. As stated above, the request from the wireless device may be implicit by the wireless device sending a measurement report to the radio access node, which then evaluates the measurements and determines to perform a handover or secondary cell connection-set-up. The decision is then transmitted in the response to the wireless device.

One embodiment of the present disclosure comprises software for executing the steps of the method for handover or connection to a secondary cell in a radio access node according to the above.

One embodiment of the present disclosure comprises a software for executing the steps of the method for handover or connection to a secondary cell in a wireless device according to the above.

DETAILED DESCRIPTION

Figure 1:
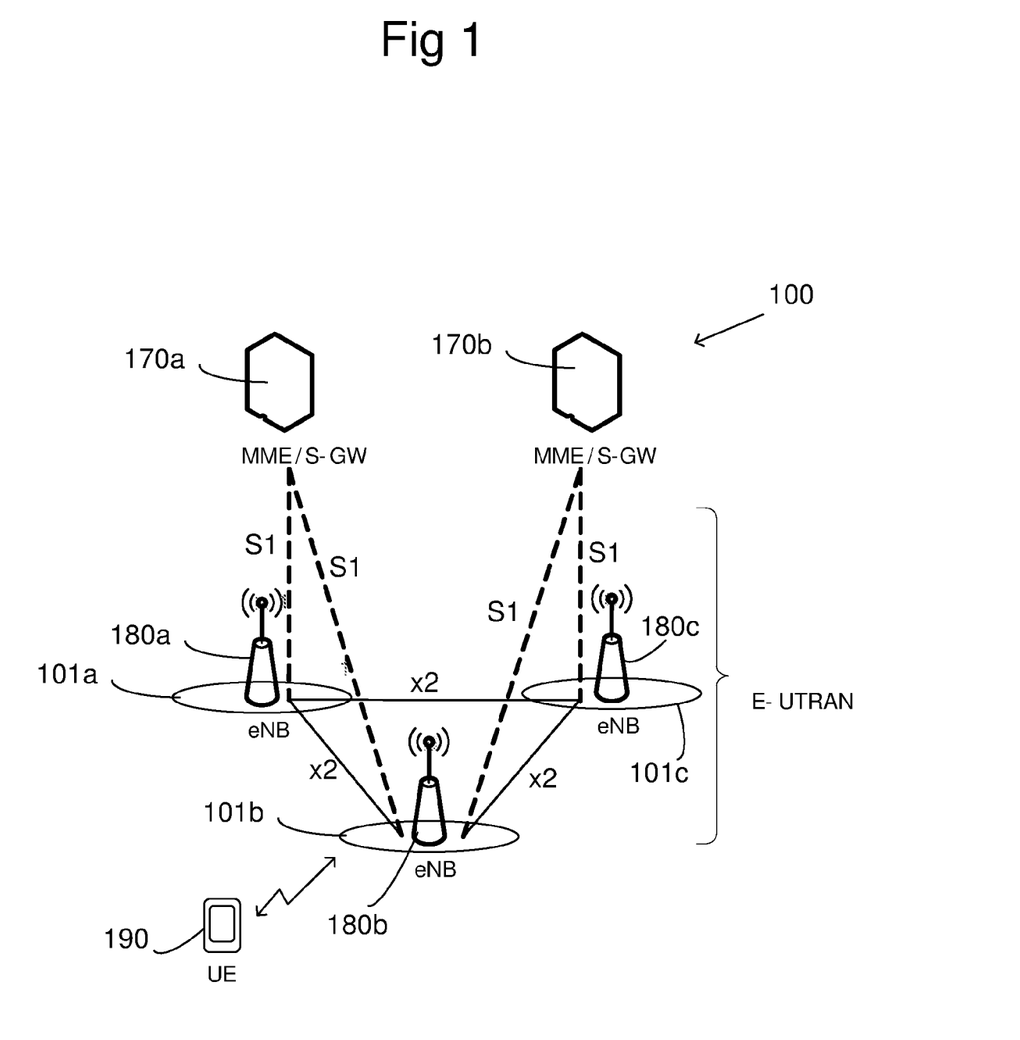
FIG. 1 shows schematically an Evolved Universal Terrestrial Radio Access Network architecture.

In FIG. 1, an example of a cellular network 100 comprises an Evolved Universal Terrestrial Radio Access Network, E-UTRAN. The E-UTRAN comprises a plurality of evolved Node Bs, eNBs, 180a, 180b, 180c. Each eNB 180a, 180b, 180c is arranged to control one or a plurality of cells 101a, 101b, 101c. Each cell is associated to a local cell identity. The local cell identity is in one example a Physical Cell Identity, PCI. The eNBs 180a, 180b, 180c are interconnected with each other via a first interface X2. The eNBs 180a, 180b, 180c are connected via a second interface S1 to an Evolved Packet Core, EPC. The EPC comprises one or a plurality of Mobility Management Entities, MMEs, and at least one Serving Gateway, S-GW, 170a, 170b. A User Equipment, UE, 190 has access to the cellular network 100 via a source cell 101b. Handover to one of the other cells 101a, 101c can be performed.

Figure 2:
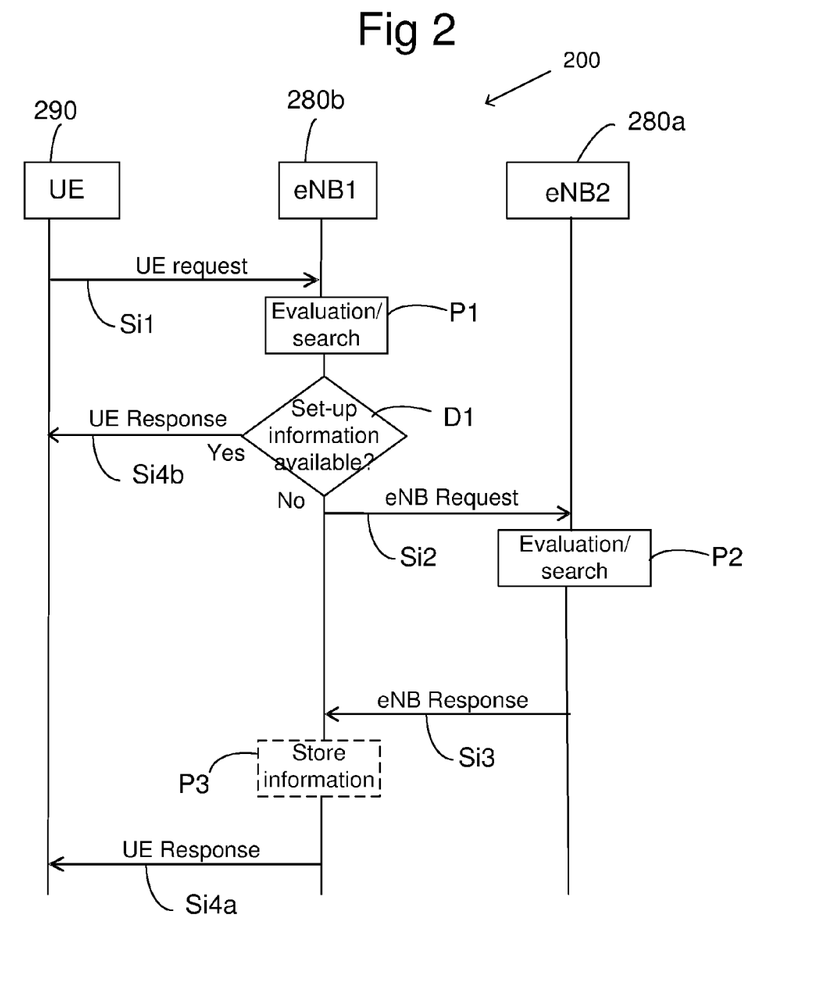
FIG. 2 shows a signalling scheme for obtaining neighbouring cell information.

FIG. 2 illustrates an example of a method 200 in a first evolved Node B, eNB, 280b and a second eNB 280a for obtaining neighbouring cell information. In a first step, the first eNB 280b receives a wireless device request Si1 for set-up information from a wireless device 290. In one example, the wireless device 290 is a user equipment, UE. The wireless device request Si1 from the wireless device comprises information related to a neighbouring cell detected by the wireless device 290. In one example, the detected neighbouring cell has capability as a secondary cell for carrier aggregation. In one example, the wireless device request Si1 from the wireless device comprises a global cell identity and/or a local cell identity associated to the detected neighbouring cell.

The first eNB 280b evaluates P1 the information related to the detected neighbouring cell so as to determine D1 whether the first eNB 280b has set-up information related to the detected neighbouring cell.

When the first eNB 280b does not have set-up information related to the detected neighbouring cell, a request Si2 for set-up information related to the detected neighbouring cell is transmitted via an interface to at least one second eNB 280a. The interface comprises in one example X2. The second eNB 280a receives the request Si2 for set-up information related to the detected neighbouring cell. The request is evaluated P2. In one example, the evaluation comprises a step of searching P2 for the identified cell in a memory comprising set-up information for at least one neighbouring cell, wherein each cell is identified by means of the global cell identity and/or the local cell identity.

In one example, the request Si2 for set-up information comprises set-up information available in the first eNB 280 related to one or a plurality of neighbouring cells.

Thereafter, a set-up response Si3 is formed based on the evaluation P3. When the evaluation shows that there is set-up information related to the identified cell in the second eNB 280a, the set-up response Si3 is formed so as to comprise the set-up information. When the evaluation shows that there is no set-up information available related to the identified cell in the second eNB 280a, the set-up response Si3 is formed accordingly. The set-up response Si3 is transmitted over the interface to the first eNB 280b.

The set-up information comprises an indicator related to the identified cell's capability for uplink transmission. The set-up information comprises in one example information related to at least one transmission frequency for the detected neighbouring cell. The set-up information comprises in one example a global cell identity and/or a local cell identity. The set-up information comprises in one example an indicator related to the capability of the detected neighbouring cell as a secondary cell for carrier aggregation.

The first eNB 280b receives the set-up response Si3 over the interface from the at least one second eNB 280a. In one example, the set-up information comprising the neighbouring cell's capability for uplink transmission in the first set-up response Si3 is a dedicated Information Element, IE or forms part of an Information Element, IE. In one example, the set-up information comprising the neighbouring cell's capability for uplink transmission in the first set-up response Si3 is comprised in Frequency Division Multiplex, FDD, information.

The first eNB 280b then transmits a set-up response Si4a to the User Equipment 290. The set-up response Si4 comprises at least parts of the information in the set-up response from the second eNB 280a. In one example, the UE set-up response Si4a comprises the indicator related to the detected neighbouring cell's capability for uplink transmission.

In one example, the first eNB 280b stores P3 the set-up information related to the detected neighbouring cell in a neighbour relation list.

Figure 3:
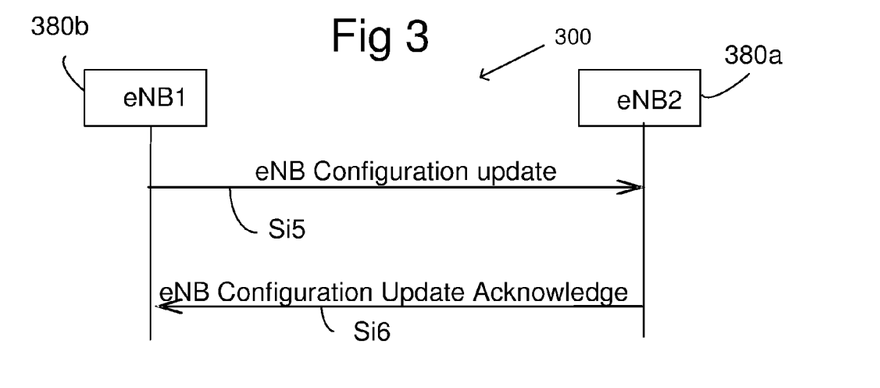
FIG. 3 shows a signalling scheme for exchange of updated configuration information.

In FIG. 3, each eNB 380b, 380a transmits configuration update messages Si5 to neighbouring eNBs 380b, 380a according to a signalling scheme for exchange of configuration update information. The respective eNBs receive the configuration update messages Si5. The configuration update messages Si5 comprise set-up information including an indicator related to a capability of cells for uplink transmission. A neighbour relation list of the receiving eNB, in the illustrated example the first eNB 380a, is in one example updated with the information in the configuration update message Si5. Further, the receiving eNB transmits a configuration update acknowledge message Si6 to the transmitting eNB upon reception of the configuration update message Si5. In one example, the configuration update message comprises set-up information related to cells in the transmitting eNB.

Figure 4:
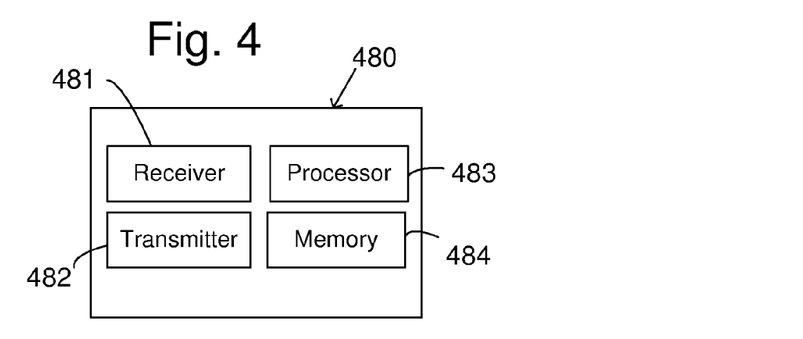
FIG. 4 shows an example of a block scheme of a radio access node for a cellular network.

In FIG. 4, a radio access node 480 comprises a transmitter 482, a receiver 481, a processing unit 483 and a memory 484. The radio access node is in one example an evolved Node B, eNB. The radio access node is arranged to obtain neighbouring cell information. The radio access node is arranged to act either as a first radio access node arranged to communicate with a wireless device or as a secondary node, arranged to provide set-up information to the first radio access node, if said set-up information is available in the second radio access node. In one example, the radio access node is arranged to operate both as the first radio access node and the second radio access node.

When acting as a first radio access node, the receiver 481 is arranged to receive a wireless device request for set-up information from a wireless device. The wireless device is in one example a User Equipment, UE. The wireless device request comprises information related to a neighbouring cell detected by the wireless device. The processing unit 483 is arranged to evaluate the information related to the detected neighbouring cell so as to determine whether the first radio access node has set-up information related to the detected neighbouring cell. When the first radio access node does not have set-up information related to the detected neighbouring cell, the processor is arranged to form a radio access node request for set-up information for the detected cell. The transmitter 482 is arranged to transmit the radio access node request for set-up information over an interface to at least one second radio access node. The receiver 481 is further arranged to receive a response to the radio access node request for set-up information, said set-up information comprising an indicator related to the detected cell's capability for uplink transmission. In one example, the memory 484 comprises a neighbour relation list comprising the set-up information related to the detected neighbouring cell.

When the radio access node acts as a second radio access node, the receiver 481 is arranged to receive a radio access node request for set-up information via an interface from a first radio access node. The processing unit 483 is arranged to evaluate the information related to the cell identified in the radio access node request so as to determine whether the second radio access node has set-up information related to the cell identified in the radio access node request, wherein the set-up information comprises an indicator related to the identified cell's capability for uplink transmission, and to form a radio access node response based on the set-up information. The transmitter 482 is arranged to transmit the radio access node response over the interface to the first radio access node.

The radio access node comprises in one example software for executing the steps for obtaining neighbouring cell information. In one example, the memory 484 comprises instructions executable by the processor 483 for obtaining neighbouring cell information.

Figure 5:
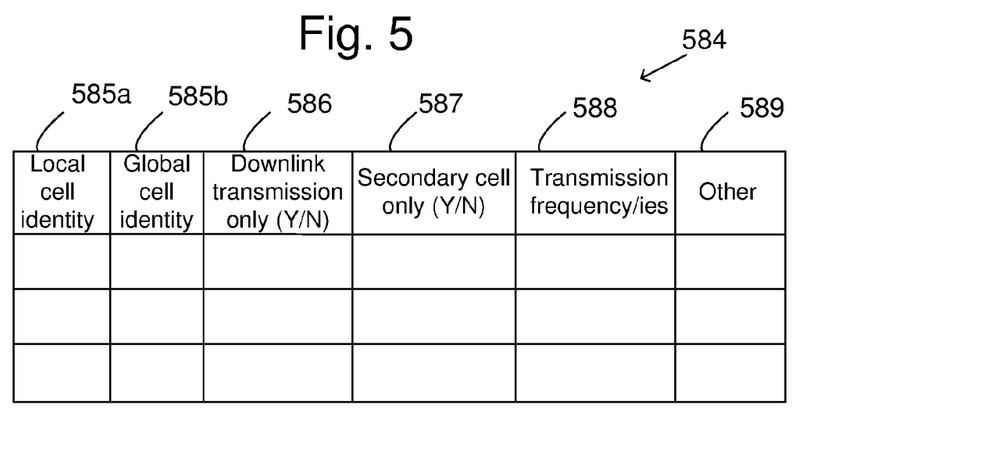
FIG. 5 shows an example of a table stored in a radio access node for a cellular network.

In FIG. 5, a neighbour relation list 584 accessible by a radio access node comprises set-up information related to a detected neighbouring cell. The set-up information comprises an indicator related to the identified cell's capability for uplink transmission 586. The set-up information comprises in one example information 588 related to at least one transmission frequency for the detected neighbouring cell. The set-up information comprises in one example a global cell identity 585*b*. The set-up information comprises in one example a local cell identity 585*a*. The set-up information comprises in one example an indicator 587 related to the capability of the detected neighbouring cell as a secondary cell for carrier aggregation. The set-up information comprises in one example other information 589. The neighbour relation list 584 is in one example stored in a memory in the radio access node.

Figure 6A:
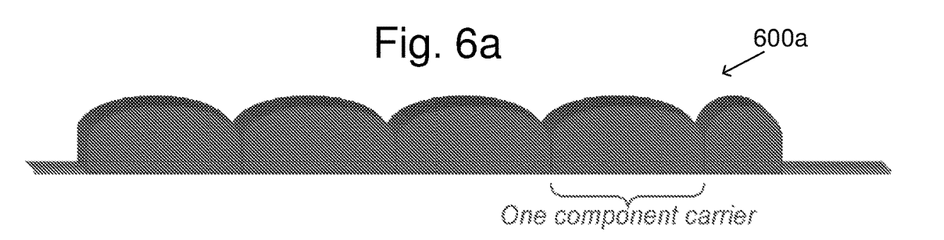
FIGS. 6a-6c shows examples of carrier aggregation.
Figure 6B:
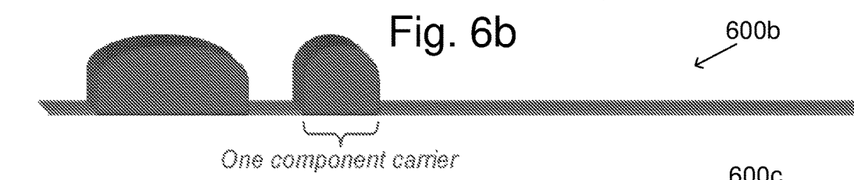
Figure 6C:
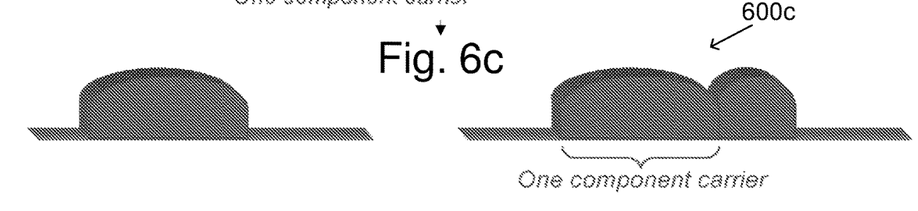

In FIGS. 6*a*-6*c*, different examples of carrier aggregation are illustrated. From LTE Release-10, aggregation of carriers is supported with individual bandwidths up to 20 MHz, which is the maximal LTE Rel-8/9 carrier bandwidth. Hence, LTE Rel-10 allows for operations wider than 20 MHz. Such operations appear as a number of LTE carriers to an LTE user equipment operating in accordance with release 10. Carrier aggregation is an optional feature in release 10 and enhancements to this feature are added in 3GPP releases later than 10.

The release 10 standard supports up to five aggregated carriers where each carrier is limited in the RF specifications to have one of six predefined bandwidths.

Carrier aggregation is called contiguous or non-contiguous intra-band if the carriers all belong to the same 3GPP operating band. FIG. 6*a* illustrates an example with contiguous intra band Carrier Aggregation 600*a*. FIG. 6*b* illustrates an example with non-contiguous intra band Carrier Aggregation 600*b*. FIG. 6*c* illustrates an example with inter-band carrier aggregation 600*c*, wherein there is at least one carrier in a different 3GPP operating band.

In an example wherein set-up information related to cell indicates that the cell has capability as a secondary cell for carrier aggregation, the set-up information comprises further information identifying type of carrier aggregation. Thus the set-up information identifies in one example that the carrier aggregation is of contiguous intra band Carrier Aggregation type, non-contiguous intra band Carrier Aggregation type or inter-band carrier aggregation type. In one example, the set-up information comprises further information related to at least one transmission frequency for the cell. The configuration of the transmission frequency information is then in one example adapted to the carrier aggregation type.

Figure 7:
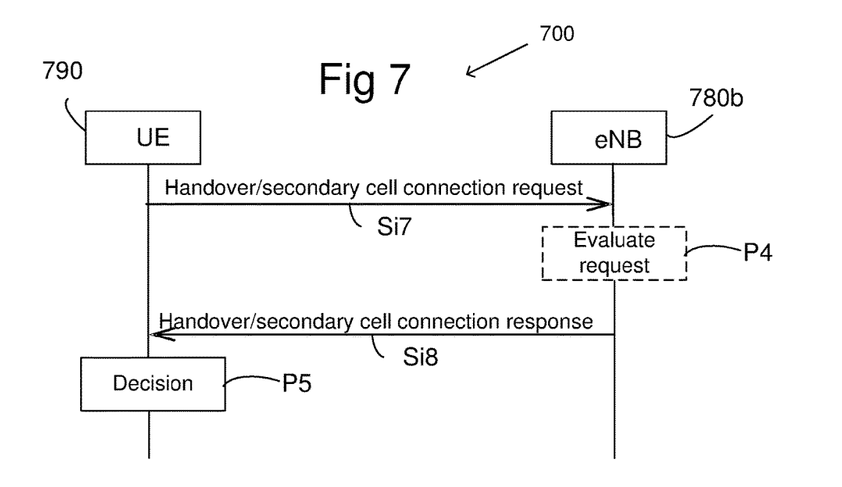
FIG. 7 shows a signalling scheme for handover or connection to a secondary cell in a radio access node.

In FIG. 7, signalling scheme for handover or connection to a secondary cell in a radio access node 780*b* is illustrated. The radio access node is in the illustrated example an evolved Node B, eNB.

A wireless device 790 transmits a hand-over or secondary cell connection request Si7 to at least one radio access node. The wireless device is in one example a User Equipment, UE. The hand-over or secondary cell connection request Si7 comprises global and/or local cell identity information associated to a cell to which hand-over or secondary cell connection is desired.

At least one radio access node 780*b* receives the hand-over or secondary cell connection request Si7 from the wireless device 790. The radio access node has a memory storing set-up information for at least one neighbouring cell. The set-up information comprises an indicator related to the respective cell's capability for uplink transmission. Each cell is identified by means of a global cell identity and/or a local cell identity. In one example, the set-up information comprises an indicator related to the respective cell's capability only as a secondary cell. In one example, the radio access node is arranged to obtain neighbouring cell information as described above.

The radio access node 780*b* forms a response Si8 to the hand-over or secondary cell connection request based on the stored set-up information. In one example, the received hand-over or secondary cell connection request Si7 is evaluated P4 based on the set-up information and the response Si8 is formed based on the evaluation. The response Si8 comprises the indicator related to the cell's capability for uplink transmission. In one example, wherein the set-up information comprises an indicator related to the respective cell's capability only as a secondary cell, the response is formed based on the indicator related to the respective cell's capability only as a secondary cell. The radio access node further transmits the formed response Si8 to the wireless device.

The wireless device receives the response Si8 to the hand-over or secondary cell connection request. The wireless device determines P5 whether to perform handover or connection to a secondary cell or not, based on the set-up information in the response.

In one example, the radio access node comprises software for executing the steps for performing handover or connection to a secondary cell in the radio access node.

In one example, the wireless device comprises software for executing the steps for performing handover or connection to a secondary cell.

Figure 8:
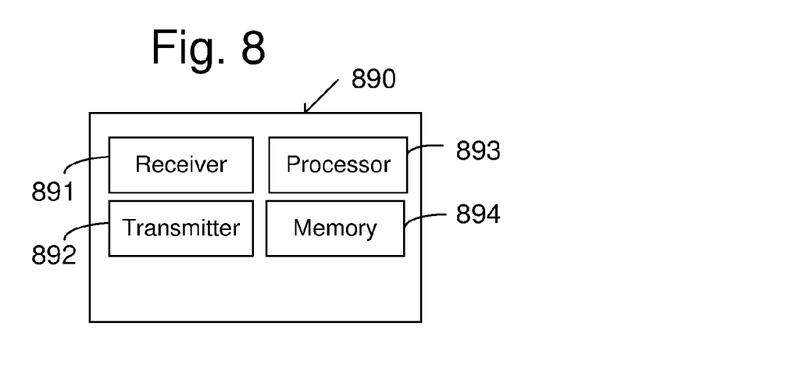
FIG. 8 shows an example of a block scheme over a wireless device for a cellular network.

In FIG. 8, an example of a block scheme over a wireless device 890 for a cellular network is illustrated. The wireless device is in one example a User Equipment, UE. The wireless device comprises a receiver 891, a transmitter 892, a processor 893 and a memory 894. The wireless device is arranged to perform handover or connection to a secondary cell.

The transmitter 892 is arranged to transmit a hand-over or secondary cell connection request to at least one radio access node. The hand-over or secondary cell connection request comprises global and/or local cell identity information associated to a cell to which hand-over or secondary cell connection is desired. The receiver 891 is arranged to receive response to the hand-over or secondary cell connection request from a radio access node. The response comprises at least an indicator related to the cell's capability for uplink transmission. The processor 893 then determines whether to perform handover or connection to a secondary cell or not, based on the set-up information in the response.

In one example, the wireless device 890 comprises software for executing the steps for performing handover or connection to a secondary cell. In one example, the memory 894 comprises instructions executable by the processor 893 for performing handover or connection to a secondary cell.

With the present disclosure, when an Automatic Neighbour Relation, ANR, function in a neighbour radio access device such as a eNB finds the DL-only cell, the cell's capability for uplink transmission is transmitted to the neighbour radio access device and this cell will not be attempted for handover.

In one example, the radio access node exemplified in FIG. 4, is further arranged for handling handover or connection to a secondary cell. The receiver 481 is then arranged to receive a hand-over or secondary cell connection request from a wireless device. The request comprises global and/or local cell identity information associated to a cell to which hand-over or secondary cell connection is requested. The processor 483 is arranged to form a response to the hand-over or secondary cell connection request based on stored set-up information comprising the indicator related to the cell's capability for uplink transmission. The transmitter 482 is arranged to transmit the formed response to the wireless device.

In one example, the radio access node 480 comprises software for executing the steps for performing handover or connection to a secondary cell. In one example, the memory 484 comprises instructions executable by the processor 483 for performing handover or connection to a secondary cell.

The invention claimed is:

1. A method in a first radio access node for obtaining neighbouring cell information, said method comprising the steps of:

transmitting via an interface a radio access node request for set-up information related to a neighboring cell to at least one second radio access node;

receiving a radio access node response over the interface from said at least one second radio access node, said radio access node response comprising set-up information including an indicator related to the neighboring cell's capability for uplink transmission; and storing the set-up information related to the neighboring cell in a neighbor relation list based on the radio access node response from said at least one second radio access node.

2. The method according to claim 1, wherein a first set-up response comprises information related to at least one transmission frequency for the neighboring cell.

3. The method according to claim 1, wherein the interface is X2.

4. The method according to claim 1, wherein the set-up information in the radio access node response is a dedicated Information Element, IE, or forms part of an Information Element, IE.

5. The method according to claim 1, wherein the set-up information in the radio access node response is comprised in Frequency Division Multiplex, FDD, information.

6. The method according to claim 1, wherein the neighboring cell has capability as a secondary cell for carrier aggregation.

7. The method according to claim 6, wherein the set-up information in the radio access node response received from the at least one second radio access node comprises an indicator related to the capability of the neighboring cell as a secondary cell for carrier aggregation.

8. The method according to claim 1, further comprising a step of receiving configuration update messages from said at least one second radio access node, said configuration update messages comprising the set-up information including the indicator related to the neighboring cell's capability for uplink transmission.

9. The method according to claim 1, further comprising a step of transmitting a wireless device set-up response to a wireless device, said wireless device set-up response comprising the set-up information including the indicator related to the neighboring cell's capability for uplink transmission.

10. A first radio access node, comprising a transmitter, a receiver, a processing unit and a memory, wherein:

the processing unit is arranged to form radio access node request for set-up information for a cell;

the transmitter is arranged to transmit the radio access node request for set-up information over an interface to at least one second radio access node;

the receiver is arranged to receive a response to the radio access node request for set-up information, said set-up information comprising an indicator related to the cell's capability for uplink transmission; and the memory comprises a neighbor relation list comprising the set-up information related to the neighboring cell.

11. The first radio access node according to claim 10, wherein the receiver is arranged to receive a wireless device request for set-up information from a wireless device, said wireless device request comprising information related to the neighboring cell detected by the wireless device, and the processing unit is arranged to evaluate the information related to the detected neighboring cell so as to determine whether the first radio access node has set-up information related to the detected neighboring cell, and to form the radio access node request for set-up information for the detected cell when the first radio access node does not have set-up information related to the detected neighboring cell.

12. A method in a second radio access node for providing set-up information, said method comprising the steps of:
receiving a radio access node request via an interface from a first radio access node for set-up information;
when there is set-up information related to an identified cell in the second radio access node, forming a set-up response comprising the set-up information, and wherein the set-up information comprises an indicator related to the identified cell's capability for uplink transmission; and
transmitting the set-up response over the interface to the first radio access node.

13. The method according to claim 12, wherein the set-up information comprises a global cell identity and/or a local cell identity.

14. The method according to claim 12, further comprising a step of searching for the identified cell in a memory comprising set-up information for at least one neighboring cell, wherein each cell is identified by means of the global cell identity and/or the local cell identity.

15. A second radio access node comprising:
a receiver arranged to receive a radio access node request for set-up information for a cell identified in the radio access node request via an interface from a first radio access node;
a processing unit arranged to evaluate the information related to the cell identified in the radio access node request so as to determine whether the second radio access node has set-up information related to the cell identified in the radio access node request, wherein the set-up information comprises an indicator related to the identified cell's capability for uplink transmission, and to form a radio access node response based on the set-up information; and
a transmitter arranged to transmit the radio access node response over the interface to the first radio access node.

16. A non-transitory computer readable medium comprising instructions which, when executed by a processor, cause the processor to carry out the steps of the method in a first radio access node for obtaining neighboring cell information according to claim 1.

17. A non-transitory computer readable medium comprising instructions which, when executed by a processor, cause the processor to carry out the steps of the method in a second radio access node for providing cell information according to claim 12.

18. A method for handover or connection to a secondary cell in a radio access node, wherein the radio access node has a memory storing set-up information for at least one neighboring cell, said set-up information comprising an indicator related to the respective cell's capability for uplink transmission, wherein each cell is identified by using a global cell identity and/or a local cell identity, the method comprising the steps of:
receiving a hand-over or secondary cell connection request from a wireless device, said request comprising global and/or local cell identity information associated to a cell to which hand-over or secondary cell connection is requested;
determining whether to perform the hand-over or secondary cell connection based on the stored set-up information comprising the indicator related to the cell's capability for uplink transmission;
forming a response to the hand-over or secondary cell connection request based on the determination; and
transmitting the formed response to the wireless device.

19. The method for handover or connection to a secondary cell in a radio access node according to claim 18, wherein the set-up information comprises an indicator related to the respective cell's capability only as a secondary cell, and wherein the response is formed based on the indicator related to the respective cell's capability only as a secondary cell.

20. The method for handover or connection to a secondary cell in a radio access node according to claim 18, further comprising a method in a first radio access node for obtaining neighboring cell information.

21. A method for handover or connection to a secondary cell in a wireless device, said method comprising the steps of:
transmitting a hand-over or secondary cell connection request to at least one radio access node, said request comprising global and/or local cell identity information associated to a cell to which hand-over or secondary cell connection is desired;
receiving a response to the hand-over or secondary cell connection request, said response comprising set-up information including an indicator related to the cell's capability for uplink transmission; and
determining to perform handover or connection to a secondary cell based on the set-up information in the response.

22. A non-transitory computer readable medium comprising instructions which, when executed on a processor, cause the processor to carry out the steps of the method for handover or connection to a secondary cell in a radio access node according to claim 18.

23. A non-transitory computer readable medium comprising instructions which, when executed on a processor, cause the processor to carry out the steps of the method for handover or connection to a secondary cell in a wireless device according to claim 21.

* * * * *